March 2, 1926.  1,575,067
L. B. LAMBERT
FUNCTIONING PARTS OF MINERAL TYPE DETECTORS
Filed Feb. 17, 1925    2 Sheets-Sheet 1
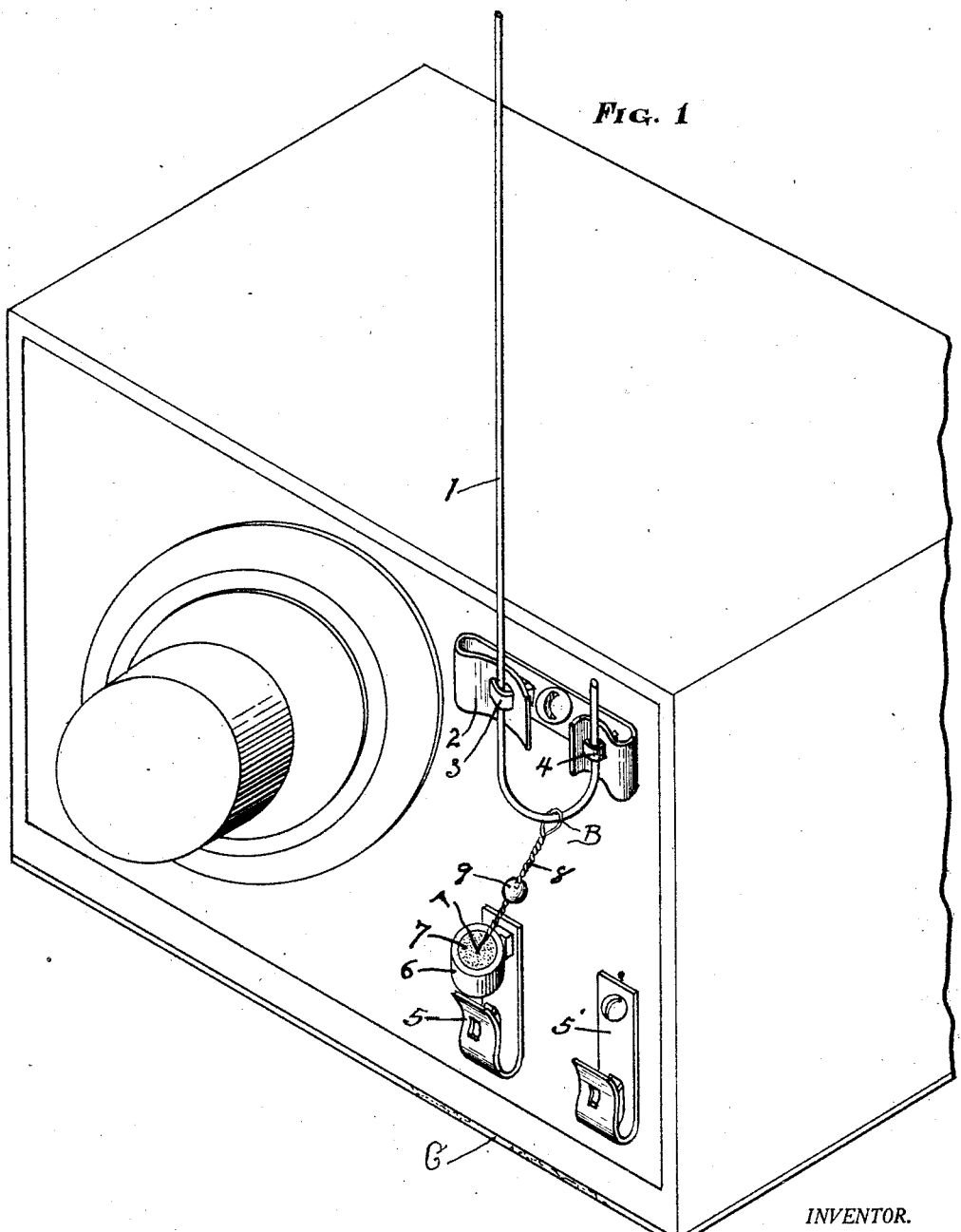
INVENTOR.
Leon B. Lambert
BY
ATTORNEY.

March 2, 1926.
L. B. LAMBERT
1,575,067
FUNCTIONING PARTS OF MINERAL TYPE DETECTORS
Filed Feb. 17, 1925     2 Sheets-Sheet 2
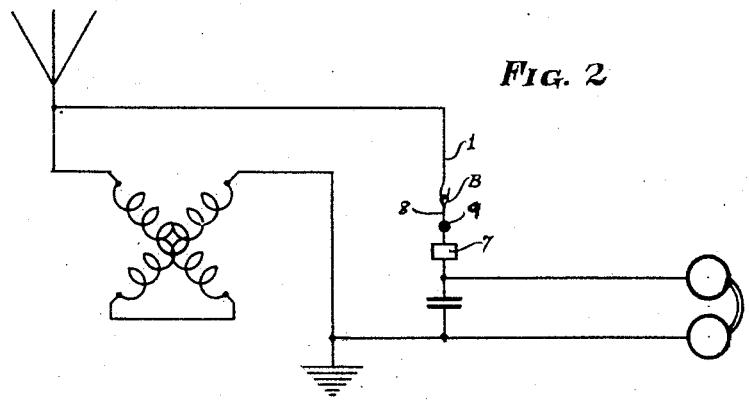
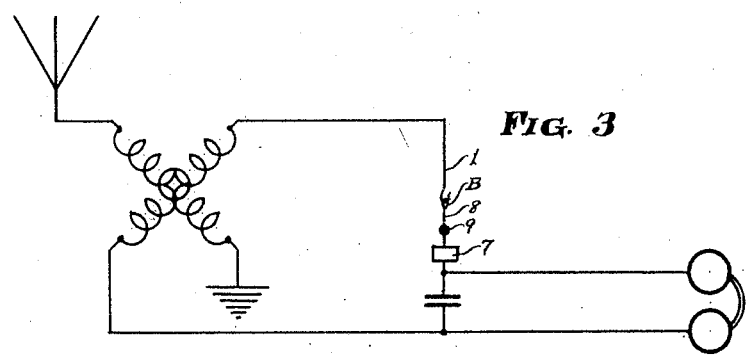
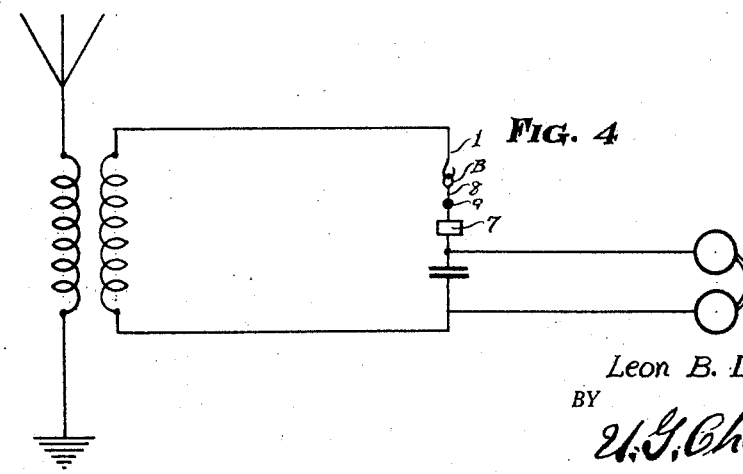
INVENTOR.
Leon B. Lambert
BY
ATTORNEY.

Patented Mar. 2, 1926.

1,575,067

UNITED STATES PATENT OFFICE.

LEON B. LAMBERT, OF WICHITA, KANSAS.

FUNCTIONING PARTS OF MINERAL-TYPE DETECTORS.

Application filed February 17, 1925. Serial No. 9,792.

*To all whom it may concern:*

Be it known that I, LEON B. LAMBERT, a citizen of the United States, residing in Wichita, county of Sedgwick, and State of Kansas, have invented certain new and useful Improvements in the Functioning Parts of Mineral-Type Detectors, reference being had to the accompanying drawings, which form a part of this application.

The object of my invention is to eliminate complicated mechanical parts, and unnecessary connections, and provide a simple adjustment for the determination of the sensitive rectifying points, and also shortening the path that the current must travel before being rectified.

A further object of my inveniton is to stabilize the acting members against undue vibration by means of damping the natural period of vibration of the adjustable contact.

Referring to the drawings; Fig. 1 is a perspective view of a mineral type receiving set, composed of a variometer, a mineral detector, a phone condenser, head phones, and necessary antenna. Fig. 2 is a wiring diagram, showing the variometer coupler, in connection with my invention. Fig. 3 is a wiring diagram, showing the variocoupler in connection with my invention. Fig. 4 is a wiring diagram showing the loose coupler in connection with my diagram. The three diagrams shown are only three of many diagrams that may be used with my invention.

1 is the antenna lead which is looped through clip 2, and rigidly held as at points 3 and 4. 5 is one of the head phone connections, and 5' is the other and ground connection, the former also supports the receptacle 6, containing the mineral 7, on which the contacting member 8 rests at its lower extremity as at A, and its upper extremity as shown looped over the antenna lead 1, as at B. 9 is a weight located at an experimentally determined point on 8, for the purpose of damping to a large degree, any sympathetic vibration occurring from adjacent sources. C is a rubber sponge on which the panel or cabinet rests.

I do not claim the tuned circuit, nor do I broadly claim the rectification by means of a mineral or synthetic crystal.

My invention is an improvement over present mechanical arrangements to obtain the same result with less connecting parts for the purpose of increasing the volume of signal strength. It will also be understood that the antenna and ground leads may be reversed, and the cat whisker or contacting member may be looped on the ground wire, and the aerial placed at 5', and the same result obtained without changing the phone connections.

The mechanism herein disclosed will operate under the wiring system of vario coupler, or loose coupler circuit in which case the contacting member, (commonly known as cat whisker), may be hung on a loop made of one end of the wire on the secondary coil.

Such modifications may be made as lie within the scope of the appended claims, and having thus described my invention, what I claim as new and desire to secure by Letters Patent is;

1. In the functioning parts of a mineral type detector radio set, the terminating end of the secondary coil having a return bend and firmly connected to the panel of the mineral set, said bend functioning as supporting means for the upper end of the contacting member, a contacting member having a loop on one end thereof, said loop adapted to engage on the bend of said terminating end of the said secondary coil, the opposite end being pointed and adapted to engage on a mineral detector, a weight intermediately positioned between said loop and point of said contacting member in combination with a rubber sponge cushion as support for said set as damping means.

2. In the functioning parts of a mineral detector radio set, a contact member, a return bend on the end of the antenna wire, the mineral detector and telephone receiver connections vertically or horizontally disposed and placed below said bend, the said contact member connected to or depending from said bend and contacting the mineral detector, a weight centrally connected to said contact member in combination with a rubber sponge cushion positioned as a support for the panel of said set as damping means.

LEON B. LAMBERT.